Figure 1:
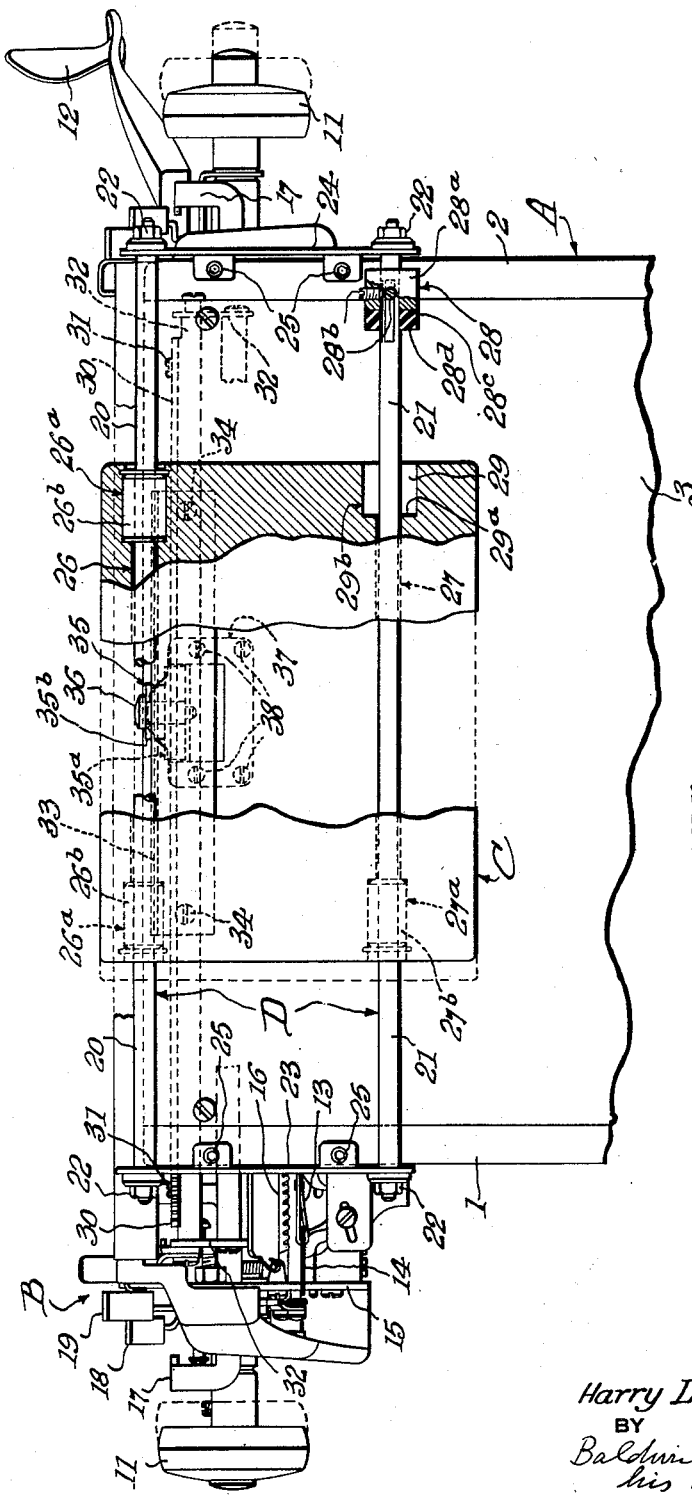

INVENTOR
Harry L. Lambert
BY
Baldwin & Wight
his ATTORNEYS

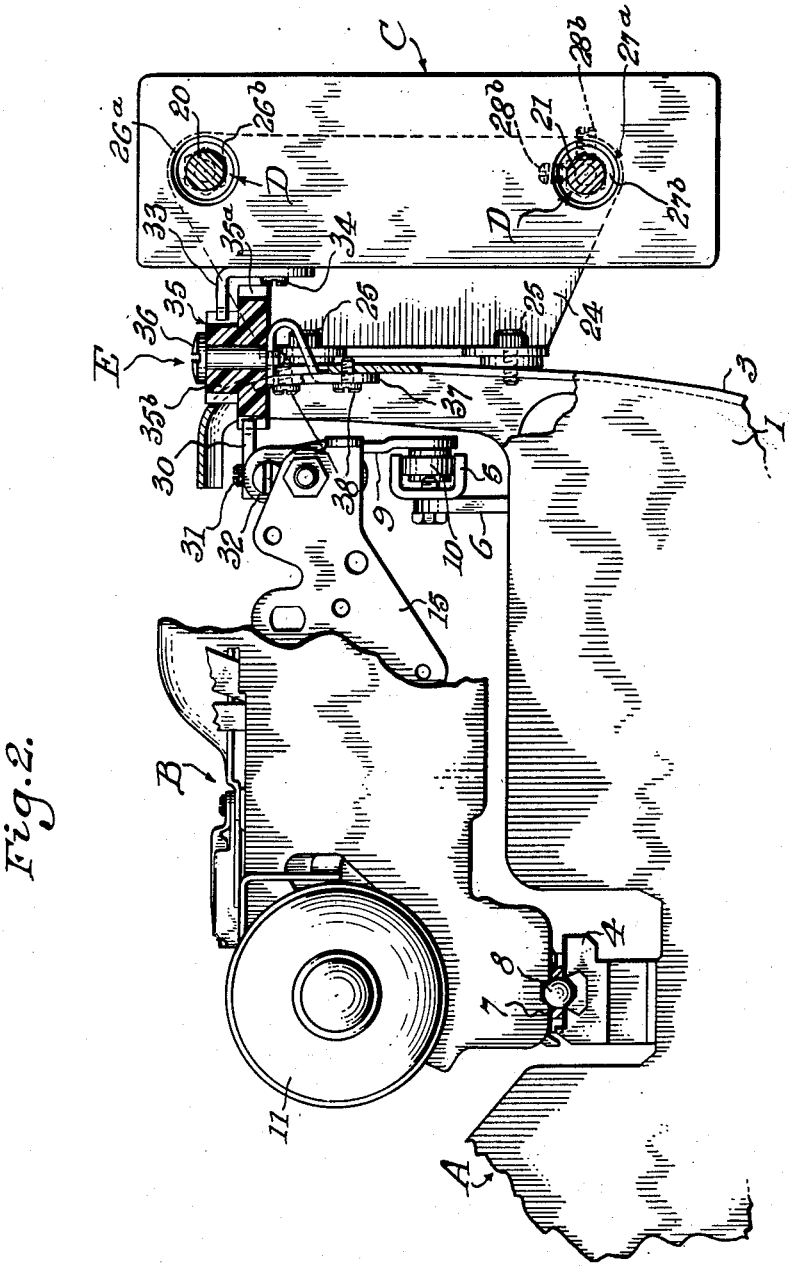

United States Patent Office 2,781,884
Patented Feb. 19, 1957

2,781,884

TILT COMPENSATOR FOR TYPEWRITER OR LIKE MACHINE CARRIAGES

Harry L. Lambert, West Hartford, Conn., assignor to Royal McBee Corporation, New York, N. Y., a corporation of New York Application October 11, 1955, Serial No. 539,748

5 Claims. (Cl. 197—82)

This invention relates to typewriters or like machines, and more particularly to mechanism associated with the travelling carriage of such a machine for offsetting or compensating for the tendency of the carriage to be urged by gravity to move along its path of letter spacing or return travel when the machine is tilted, as for example when the machine is in use on a ship which, from time to time, is in a rolled or listed position.

The travelling carriages of most typewriters, both manually operated and power operated, are urged in the letter spacing direction by a spring motor, the incremental letter spacing movements of the carriage being controlled by an escapement mechanism. Carriage return movements are effected either by manual effort or by power sufficient to overcome the driving urge of the spring motor. The latter is so constructed or adjusted that when the machine is in a normal operating position such that the carriage travels along a predetermined, e. g. horizontal, path a moderate predetermined force is required to overcome the driving urge of the spring motor and return the carriage to its line starting position.

If, however, the machine is tilted so that the carriage is required to travel in an abnormal path, the relation of the force required to return the carriage to the driving urge of the spring motor is abnormalized. Thus, if a machine, so constructed that its carriage normally travels along a horizontal path, is tilted so as to cause the path to be inclined downwardly from right to left, that is in the letter spacing direction, the carriage will be urged toward the left by gravity in addition to being urged in the same direction by the spring motor. The total force urging the carriage to the left may so exceed the normal urging or driving force as to cause the carriage to jump too suddenly when the escapement mechanism is operated, and faulty typing may result. On the other hand if the machine is tilted so as to cause the carriage travel path to be downwardly inclined from left to right, that is in the return direction, the force of gravity may overcome the urge of the spring motor so that the latter will be unable to drive the carriage in the letter spacing direction. If the machine is tilted very much the action of gravity may cause the carriage to run to the right, displacing it from its proper position for typing or even causing it to be brought sharply into its right end stopped position with a harmful shock.

An object of the present invention is to provide improved mechanism for offsetting or compensating for the tendency of a typewriter or like carriage to travel under the urge of gravity when the machine is tilted.

Another object of the invention is to provide improved mechanism of the kind referred to including a compensator member arranged to travel parallel to the carriage travel path, and drive transmitting means so interconnecting the carriage and the compensator member that carriage travel is accompanied by travel of the compensator member parallel to but in a direction opposite to the carriage travel.

A further object of the invention is to provide a mechanism of the class referred to in which the compensator member has a mass greater than the mass of the carriage and in which the drive transmitting ratios of the drive transmitting means to the carriage and to the compensator are so related to the difference in their masses that the tendencies of both the carriage and the compensator to move under gravity urge substantially offset or counterbalance each other.

Other objects of the invention will become apparent from a reading of the following description, the appended claims, and the accompanying drawings, in which:

Figure 1 is a fragmentary rear elevation of a standard typewriter embodying the invention, some parts being omitted and others being shown in vertical section; and Figure 2 is a fragmentary right side elevation of the machine, with some parts omitted and others shown in section.

A preferred form of the invention is illustrated as being embodied in a Royal standard office typewriter of well-known construction. The machine shown includes a main frame A and a carriage member B mounted on the frame A for letter spacing travel from right to left as viewed by the operator (from left to right as viewed in Figure 1), and for return travel in the opposite direction. The frame A includes the usual right and left side walls 1 and 2 and rear wall 3.

For mounting the carriage for letter spacing and return travel, the frame is equipped with horizontal track means including a front bottom rail 4 and a rear channel shaped rail 5 supported on the frame by brackets, one of which is shown at 6 in Figure 2. Both of the rails 4 and 5 extend substantially from side to side of the frame A. The carriage B is formed or equipped with a front rail 7 supported antifrictionally on the frame rail 4 by balls, one of which is shown at 8 in Figure 2. The carriage is also provided with a depending bracket 9 equipped with a roller 10 positioned to run on the lower part of the frame mounted rail 5 for supporting the rear part of the carriage.

The carriage member B is shown as being provided with equipments or appurtenances customarily included in standard machines of the kind illustrated. A sheet feeding platen or cylinder (not shown) is provided with nobs 11 by which the platen or cylinder may be rotated. Rotation of the platen or cylinder also may be effected by the usual combined line spacing and carriage returning mechanism of which one part, namely the line spacing and carriage returning lever 12, is shown in Figure 1. Parts of the line spacing mechanism not shown in the drawings may be of the kind and organization shown in the patent to Myers 1,953,428, dated April 3, 1934.

The carriage is constantly urged toward the operator's left (toward the right in Figure 1) by a spring motor, not shown, which may be of the kind disclosed in the patent to Ryan 2,678,122, dated May 11, 1954, the motor driving effort being transmitted to the carriage through a draw band 13 shown in Figure 1 as being connected through a metal connector device 14 to the right carriage end plate 15.

Escapement mechanism which includes an escapement rack 16 on the carriage and which may be of the kind disclosed in the patent to Hart 2,563,722, dated August 7, 1951, is interposed between the carriage and the frame for controlling the incremental letter by spacing movements of the carriage under the driving urge of the spring motor.

Some of the parts illustrated as being mounted on the carriage, although not being directly concerned with the present invention, include the usual escapement release lever 17, sheet feeding pressure roll release lever 18, and margin stop setting control lever 19.

The mechanism described so far is now well-known and does not, in itself, constitute the present invention. The invention comprises other mechanism to be described and the combination thereof with known mechanism described above.

In accordance with the invention, a typewriter or like machine is provided with an improved compensator mechanism including a compensator member mounted on the stationary frame to travel along a path parallel to the path of carriage travel, and means generally designated E interconnecting the carriage and the compensator member for causing travel of the carriage to be accompanied by parallel but opposite travel of the compensator member. In the form shown, a compensator member generally designated C is mounted to travel parallel to the carriage travel by guide means generally designated D. The guide means D includes upper and lower horizontal rods 20 and 21 the threaded ends of which are secured by nuts 22 to brackets 23 and 24 fixed respectively to the right and left sides 1 and 2 of the frame A by screws 25. Preferably, the brackets 23 and 24 are substantially flush with the respectively adjacent sides of the frame A and, in effect, form parts of the stationary frame.

The compensator member C is shown as consisting simply of a metal weight or block formed with parallel horizontal bores 26 and 27 which receive the guide rods 20 and 21 respectively. The upper bore 26, which is of larger diameter than the rod 20, is formed at its opposite ends with counterbores 26$^a$ in each of which is positioned an antifriction bearing 26$^b$ of any suitable kind for mounting the compensator C for easy longitudinal movement on the guide rod 20. One end of the bore 27, which is of larger diameter than the rod 21, is counterbored at 27$^a$ for receiving a similar antifriction bearing 27$^b$ through which the guide rod 21 passes.

Through the intermediary of drive transmitting connections to be described later, the compensator C is moved longitudinally on the rods 20 and 21 concomitantly with travel of the carriage, the arrangement being such that when the carriage is performing letter spacing movements (toward the right in Figure 1) the compensator C moves toward the left as viewed in Figure 1, and when the carriage is being moved in the return direction the compensator C moves toward the right as viewed in Figure 1. Since return movement of the carriage usually is a continuous or sweeping movement terminated when the carriage reaches its end or line starting position, it is desirable to provide means for cushioning the stopping of the compensator C at the end of its corresponding movement so as to prevent any harmful shock. For this purpose, a buffer, generally designated 28, is mounted on the left end of the guide rod 21 (the right end of the rod as viewed in Figure 1) and is positioned so as to be engaged by the compensator C when the latter approaches the end of its movement corresponding to the return movement of the carriage. The buffer 28 includes a metal body 28$^a$ secured in adjusted position on the guide rod 21 by set screws 28$^b$, and a resilient cushion 28$^c$ of rubber or similar material adhered to the body 28$^a$ and having a contact face 28$^d$ presented toward the compensator C. The latter is formed with a counterbore providing a socket 29 aligned with the buffer 28, and having a root or bottom surface 29$^a$ engageable with the buffer face 28$^d$ and a wall 29$^b$ adapted to surround the buffer 28 when the face 28$^d$ of the latter engages the socket bottom surface 29$^a$. The counterbore or socket 29 enables the compensator C to partake of a maximum travel within the confines of the frame structure, and a compact arrangement is thus provided.

The drive transmitting means E interposed between the carriage B and the compensator C comprises a rack 30 secured by screws 31 to the tabulator stop support assembly 32 which forms part of the carriage, and a rack 33 secured to the compensator C by screws 34 and extending horizontally and parallel to the carriage mounted rack 30, both racks being parallel to the direction of carriage letter spacing and return travel. Toothed gearing between the racks 30 and 33 includes a compound gear generally designated 35 mounted to rotate on a shaft 36 fixed to a bracket 37, in turn secured to the rear wall 3 of the frame A by screws 38. The gear 35 is formed with a part 35$^a$ of relatively large diameter meshing with the frame mounted rack 30, and a part 35$^b$ of relatively small diameter meshing with the rack 33. The racks 30 and 33 and the gear 35 so interconnect the carriage B and the compensator C that letter spacing and return travel of the carriage will be accompanied by parallel travel of the compensator in the opposite direction.

The carriage B desirably, if not necessarily, is movable to end positions in which it projects beyond the sides of the frame, but it is preferred that the compensator C have a more limited travel confined within and between the sides of the main frame A. Consequently, movement of the compensator, although always taking place concurrently with and oppositely to movement of the carriage, should be at a slower speed. This condition is provided by the differential drive transmitting ratio which the gear 35 provides between the racks 30 and 33.

In view of the different mechanical advantages of the carriage and the compensator with relation to the gear 35, and because of the desirability of having the tendency of the carriage to be urged by gravity offset by the tendency of the compensator C to be urged by gravity in the same direction as the carriage, the mass of the compensator C should be greater than the mass of the carriage and its appurtenances. Thus, in the illustrated construction in which the diameter of the gear part 35$^a$ is approximately twice the diameter of the gear part 35$^b$, the mass of the compensator C may be approximately twice that of the carriage B. More generally, the drive transmitting ratios of the interconnecting means E to the carriage B and to the compensator C are so related to the masses of the members B and C that force is applied from the smaller of the two masses to the drive transmitting gear 35 with a larger mechanical advantage than the force applied from the larger of the two masses to the gear 35. With the existence of such relations, the tendencies of both the carriage B and the compensator C to be moved in the same direction by gravity when the machine is tilted offset one another so that the net tendency of the carriage to be moved by gravity is nil, or inconsequential.

When the typewriter is being used under normal conditions with the carriage track means and the guide means D both substantially level or horizontal, there is no tendency for either the carriage or the compensator C to move in either direction of carriage travel under the influence of gravity. If the typewriter is tilted, say in a manner to place its left side lower than its right side, thus inclining the path of carriage travel downwardly in the direction of letter spacing movement, both the carriage and the compensator C will be urged by gravity to move in the letter spacing direction. However, because of the reversing drive transmitting connections E, the tendency of the carriage to be moved by gravity will be offset by the tendency of the compensator to be moved by gravity. Consequently, the normal relation between the force exerted by the spring motor through the draw band 13 and the force required to return the carriage against the urge of the spring motor will be preserved and the machine can be operated normally.

Assuming that the machine be tilted in the opposite sense, that is so that the paths of carriage travel and compensator travel are inclined downwardly in the carriage return direction, the tendency of the carriage to be moved by gravity in the return direction will be offset by the tendency of the compensator C to be moved by gravity in the same direction. Therefore, the carriage will not coast or run from left to right, the proper typing positioning of the carriage with respect to the frame A will not be disturbed, and the force required to be applied to the carriage to move it in operating the machine will be normal.

While the provision of compensating mechanism in accordance with this invention may introduce added weight and may increase the inertia force to be overcome in effecting movements of the carriage, these factors are subordinate to the advantages of preventing abnormal or unruly action of the carriage when the machine is used under conditions such that at least temporary tilting is unavoidable.

The construction shown embodies the invention in a preferred form, but it is intended that the disclosure be illustrative rather than definitive, the invention being defined in the claims.

I claim:

1. In a typewriter or like machine, the combination of a frame; a carriage member mounted on said frame for letter spacing and return travel; a compensator member mounted on said frame for travel parallel to the direction of carriage member letter spacing and return travel; and drive transmitting means interconnecting said carriage member and said compensator member for causing letter spacing and return travel of said carriage member to be accompanied by parallel travel of said compensator member in the opposite direction, the respective masses of said carriage member and said compensator member being different and the drive transmitting ratios of said drive transmitting means to said members respectively being so related to the difference between said masses that force is applied from the smaller of the two masses to said drive transmitting connections with a larger mechanical advantage than is the force applied from the larger of the two masses to said drive transmitting connections.

2. In a typewriter or like machine, the combination of a frame; a carriage member mounted on said frame for letter spacing and return travel; a compensator member mounted on said frame for travel parallel to the direction of carriage member letter spacing and return travel and having a greater mass than that of said carriage member; a first rack on said carriage member extending parallel to the direction of carriage member letter spacing and return travel; a second rack on said compensator member extending parallel to said first rack; a first gear part of relatively large diameter meshing with said first rack; and a second gear part of relatively small diameter rotatable conjointly with said first gear part and meshing with said second rack, said gear parts and said racks being cooperable to cause letter spacing and return travel of said carriage member to be accompanied by travel of said compensator member in parallel but opposite directions.

3. In a typewriter or like machine, the combination of a frame; track means on said frame which is substantially level when the machine is in its normal position for use but which will be inclined to the horizontal if the machine is tipped with one side higher than the other; a carriage member mounted on said track means for letter spacing and return travel and being of such a length that at opposite ends of its travel its opposite end portions project respectively beyond the opposite sides of said frame; guide means on said frame extending parallel to said track means and within the confines of the opposite sides of said frame; a compensator member mounted on said guide means for travel parallel to the direction of carriage member letter spacing and return travel; and drive transmitting means interconnecting said carriage member and said compensator member for causing letter spacing and return travel of said carriage member to be accompanied by parallel travel of said compensator member in the opposite direction, the drive transmitting ratio of said drive transmitting means with respect to said carriage member and said compensator member and the length of said compensator member in the direction of its travel being such that travel of said carriage member from an end position in which it projects beyond one side of said frame to an opposite end position in which it projects beyond the other side of said frame is accompanied by travel of said compensator member entirely within the confines of the opposite sides of said frame.

4. In a typewriter or like machine, the combination of a frame; track means on said frame which is substantially level when the machine is in its normal position for use but which will be inclined to the horizontal if the machine is tipped with one side higher than the other; a carriage member mounted on said track means for letter spacing and return travel and being of such a length that at opposite ends of its travel its opposite end portions project respectively beyond the opposite sides of said frame; guide means on said frame extending parallel to said track means and within the confines of the opposite sides of said frame; a compensator member mounted on said guide means for travel parallel to the direction of carriage member letter spacing and return travel; and rack and gear drive transmitting means interconnecting said carriage member and said compensator member for causing letter spacing and return travel of said carriage member to be accompanied by parallel travel of said compensator member in the opposite direction, the drive transmitting ratio of said drive transmitting means with respect to said carriage member and said compensator member and the length of said compensator member in the direction of its travel being such that travel of said carriage member from an end position in which it projects beyond one side of said frame to an opposite end position in which it projects beyond the other side of said frame is accompanied by travel of said compensator member entirely within the confines of the opposite sides of said frame.

5. In a typewriter or like machine, the combination of a frame member; track means on said frame member; a carriage mounted on said track means for letter spacing and return travel; guide means on said frame member extending parallel to said track means; a compensator member mounted on said guide means for travel parallel to the direction of carriage letter spacing and return travel; means interconnecting said carriage and said compensator member for causing letter spacing and return travel of said carriage to be accompanied by parallel travel of said compensator member in the opposite direction; a resilient buffer on one of said members extending toward the other of said members and having an end face presented toward said other of said members; and a socket in said other of said members opening toward and being aligned with said buffer and having a root surface engageable with said face of said buffer and a wall adapted to surround said buffer when said root surface and said buffer face are in engagement.

References Cited in the file of this patent

UNITED STATES PATENTS

| | | |
|---|---|---|
| 2,121,086 | Kurowski | June 21, 1938 |
| 2,533,111 | Hartman | Dec. 5, 1950 |